UNITED STATES PATENT OFFICE.

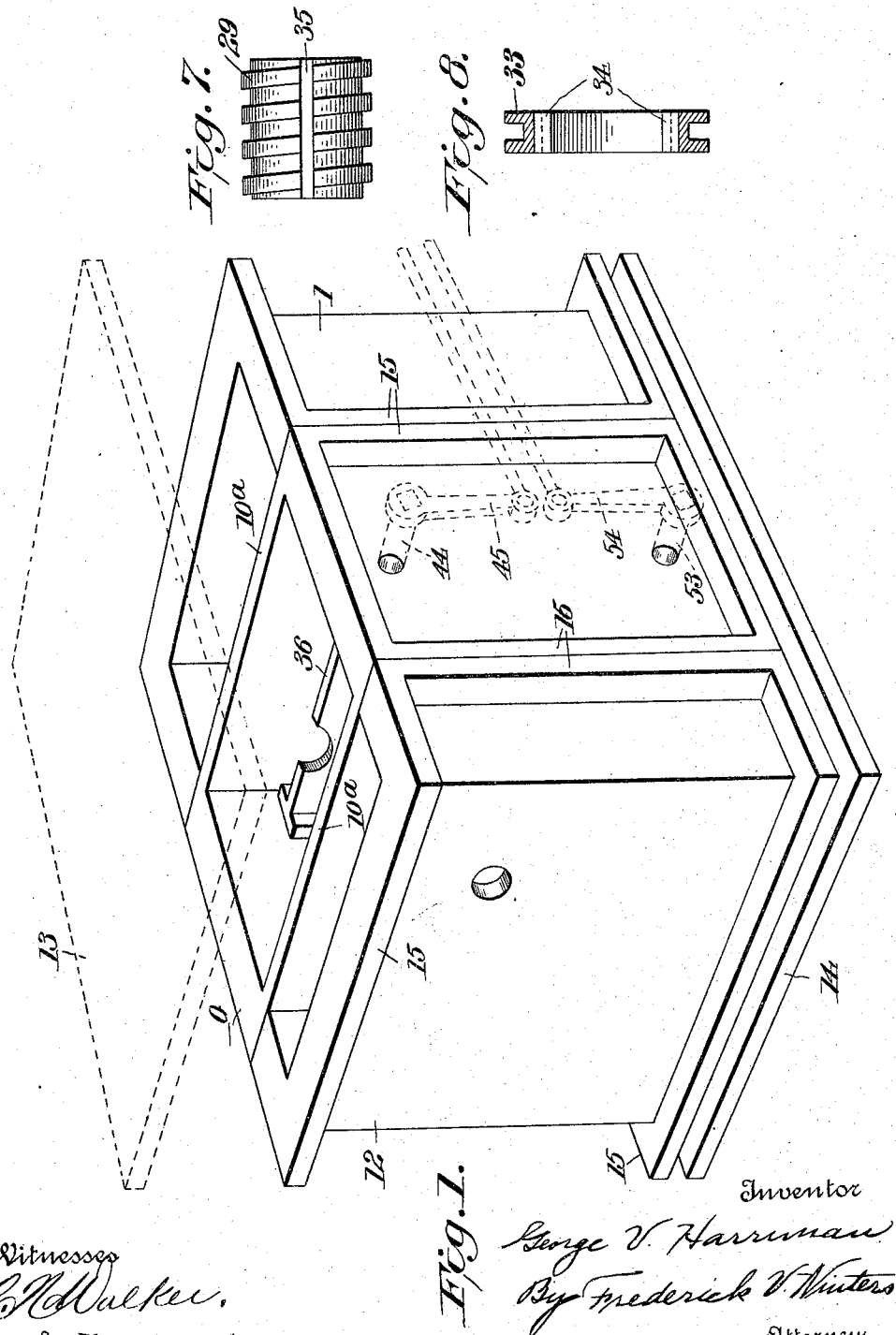

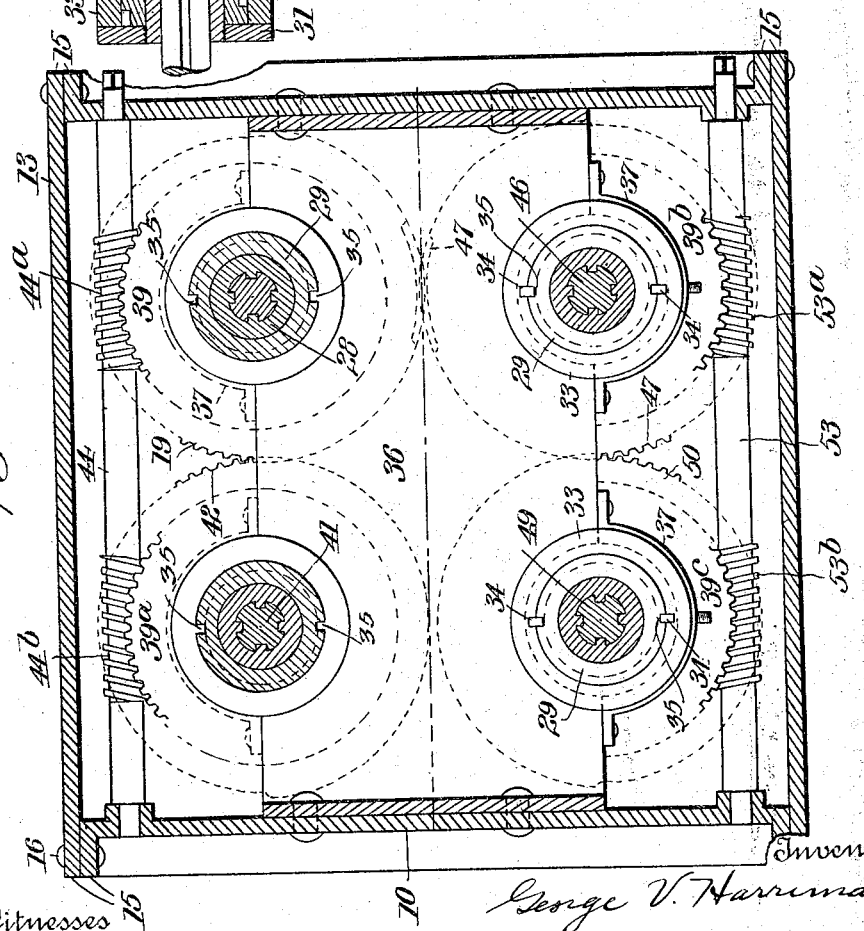
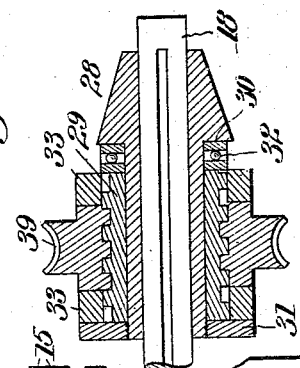
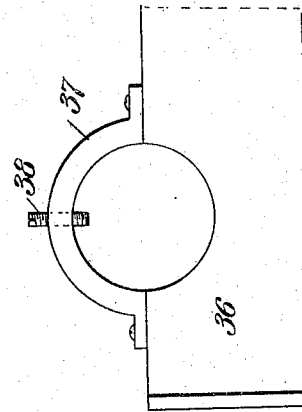

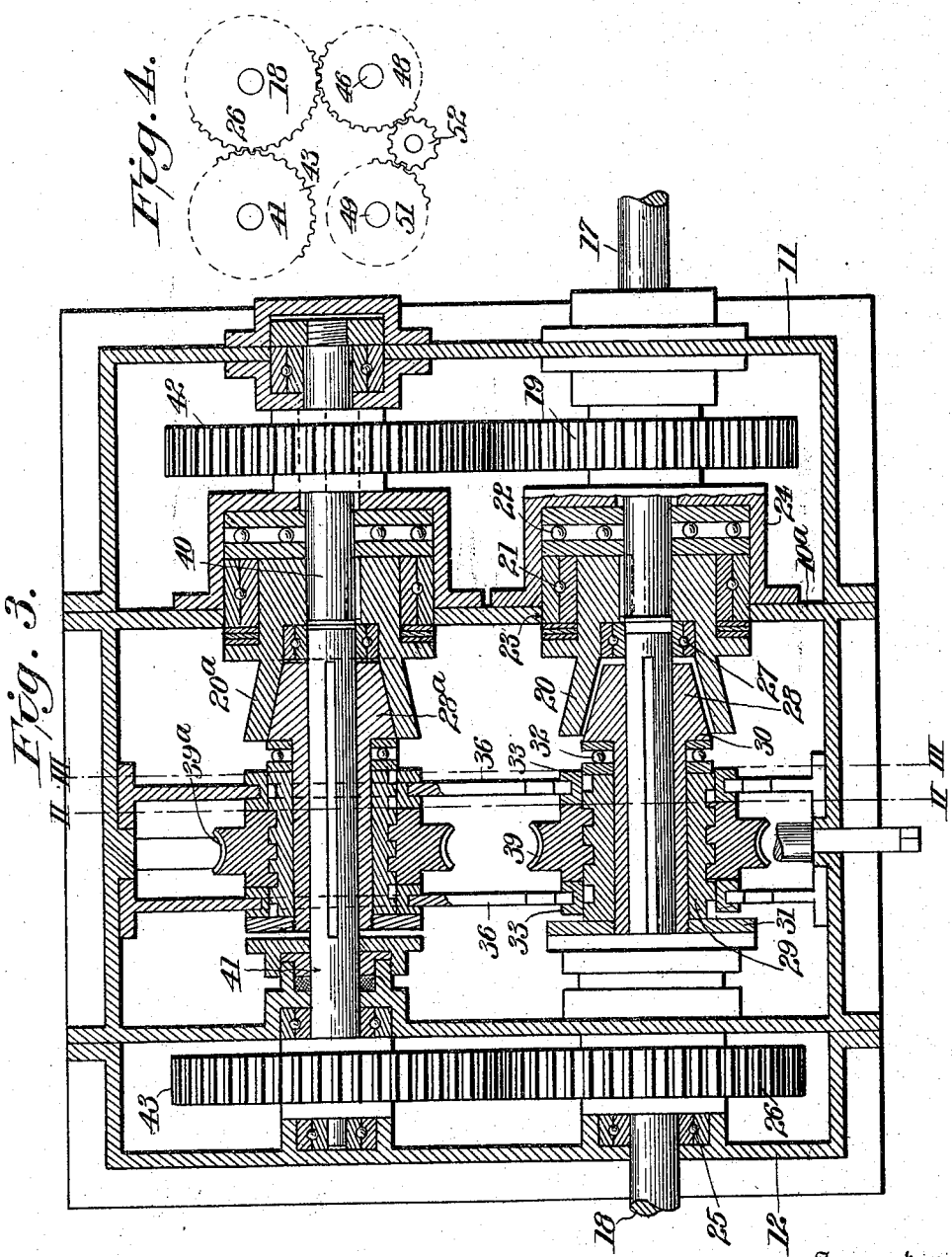

GEORGE V. HARRIMAN, OF NEW YORK, N. Y.

TRANSMISSION FOR AUTOMOBILES.

1,191,892.  Specification of Letters Patent.  Patented July 18, 1916.

Application filed December 16, 1914. Serial No. 877,570.

*To all whom it may concern:*

Be it known that I, GEORGE V. HARRIMAN, a citizen of the United States, residing at New York, in the county and State of New York, have invented certain new and useful Improvements in Transmission for Automobiles, of which the following is a full, clear, and exact specification.

This invention relates to transmission gearing for automobiles, and has for its object to provide a simplified construction and arrangement of parts, whereby power may be transmitted noiselessly and without injury to the mechanism, the changes in speed may be effected at any time without injurious effects, and friction will be reduced to a minimum, while retaining the lever actions to which the public in general has become accustomed in the selective type of transmission.

Another object is to so construct and assemble the parts that they may be readily accessible for inspection and repairs and the operator or owner may renew the wearing parts without shop service.

For the further convenience and economy of the owner or operator, it is the aim of this invention to increase the strength and efficiency of all the wearing parts and bearing points, to conform in construction to the fixed and standardized parts, and to make the parts interchangeable as far as possible.

Other objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views, Figure 1 is a perspective view of the casing or housing for the transmission mechanism, the top thereof being shown in broken lines in order to disclose part of the interior, and the bottom being spaced from the walls of the casing to better illustrate how it can be removed to permit inspection and repairs. Fig. 2 is a transverse vertical sectional view through the casing and the mechanism mounted therein, the upper half of said section being taken on the line II—II of Fig. 3 and the lower half on the line III—III of the same figure. Fig. 3 is a horizontal section taken through the upper group of shafts, the clutches being arranged for the second speed. Fig. 4 is a detailed view of the intermeshing gears on the transmitting driven shaft in line with the driving shaft, and on the shafts of the other end to end pairs corresponding to said transmitting driven shaft, the intermediate reversing gear being also shown. Fig. 5 is a detailed sectional view of one of the movable friction clutch members with its operating threaded sleeve and its intermeshing worm operated gear. Fig. 6 is a detailed side view of one of the bearings for the spools which hold the threaded operating sleeves against turning. Fig. 7 is a detailed view of one of said sleeves, and Fig. 8 is a detailed view of one of the said spools.

The casing or housing for the transmitting mechanism, as best illustrated in Fig. 1, is made in sections so that certain of said sections may be removed for inspection of the mechanism within and making repairs without taking down the whole transmission or requiring shop service. As illustrated, the casing consists of a middle section 10, two end sections 11 and 12, a top or cover 13 and a bottom plate 14. All of these parts are provided with angularly extending flanges 15, whereby said parts may be detachably connected by bolts 16, the top and bottom plates being secured along their edges to the adjacent flanges on the other parts. The middle section 10 has four walls but is open at the top and bottom, while the end sections 11 and 12 have three walls each and are open at the top and bottom, the end walls 10ª of the middle section constituting transverse vertical partitions in the casing as a whole, and the top and bottom plates 13 and 14 serving to cover or close the top and bottom openings in all three sections 10, 11 and 12. It will be observed that said top and bottom plates may be taken off, and also the two end plates or sections and access thus be had to all the parts of the mechanism without disturbing the main bearings for all the shafts and clutches which are carried by the middle section 10.

As best illustrated in Fig. 3, four pairs of end to end shafts are journaled in the end walls 10ª of the middle section of the casing, each pair comprising what will be hereinafter termed a driving and a driven shaft. The driving shaft 17 of one pair is the motor shaft and the other shaft 18 of that pair is the transmitting driven shaft. These two shafts are the only ones which extend beyond the casing, the other three pairs of shafts being entirely contained within the casing and serving to give two forward speeds in addition to the direct drive from the motor driven shaft 17 to the transmitting driven shaft 18, and a reverse drive.

The shaft 17 is journaled in the end section 11 of the casing and in the adjacent end wall 10$^a$ of the middle section of said casing. A gear 19 is keyed to turn with said shaft in the space between the end section 11 and the middle section of the casing. On the inner end of the shaft 17, a friction clutch member 20 is keyed or otherwise fixed to turn therewith. Antifriction bearings 21 and 22 may be provided for reducing the friction caused by the rotation and thrust of said shaft, these bearings being disposed between the annular surface of the clutch member 20 and a suitable opening 23 in the wall 10$^a$ of the middle section of the casing and the inner annular surface of a cap 24, and between the ends of said clutch member and cap, respectively.

The shaft 18 is journaled in the end section 12 and the other end wall 10$^a$ of the middle section of the casing, suitable antifriction bearings 25 being provided. A gear 26 is keyed to turn with the shaft 18 in the end section 12 of the casing. The inner end of said shaft extends into the clutch member 20 and is fitted within an antifriction bearing 27 in the inner part of said clutch member. A friction clutch member 28, supplementary to the clutch member 20, is splined on the shaft 18 in the middle section of the casing. The clutch member 28 is preferably conical and designed to enter a cone cup on the other clutch member 20.

The clutch member 28 is actuated by a sleeve 29 fitted loosely around the middle portion of said clutch member between shoulders or flanges 30 and 31. An antifriction bearing 32 is placed between the shoulder 30 adjacent the cone, and the corresponding end of the sleeve 29 to take the thrust in operation. Said sleeve is guided in spools 33 having keys 34 fitted to slide in axial grooves 35 in the sleeve 29. The spools 33 are arranged in notches in narrow transverse partitions 36 in the middle section of the casing, and are retained in said notches by straps 37, see Fig. 6. Said spools are held against turning by set screws 38 passed through the straps 37. As will be seen in Fig. 3, two spools 33 are used, and between them is arranged a worm gear 39 having its bore threaded to engage the correspondingly threaded outer surface of the sleeve 29. The spools being held against turning by the set screws 38, and said sleeve being held against turning within the spools by the keys 34 engaging the slots 35, it is evident that rotation of the worm gear 39 will move the sleeve 29 axially, owing to the threaded connection between said gear and sleeve, and that the axial movement of the sleeve will impart a similar movement to the clutch member 28, tending to advance the same into driving connection with the supplemental clutch member 20, or vice versa.

The second speed pair of shafts 40 and 41 are arranged on the same level with the shafts 17 and 18. The driving shaft 40 of this pair carries a fixed gear 42 which is constantly in mesh with the gear 19 on the motor shaft 17. Said shaft 40 carries a clutch member 20$^a$ similar to the clutch member 20 on the shaft 17. The shaft 41 carries a fixed gear 43 which is constantly in mesh with the gear 26 on the shaft 18. Said shaft 41 also carries a clutch member 28$^a$ splined thereon and corresponding to the clutch member 28 on the shaft 18. The clutch member 28$^a$ is provided with operating mechanism similar to that described in connection with the clutch member 28. The worm gear 39$^a$ of the operating mechanism for the clutch member 28$^a$, is arranged in line with the worm gear 39, and both of said worm gears, which are oppositely threaded from each other, are engaged by oppositely threaded sections 44$^a$ and 44$^b$ of a rock-shaft 44, see Fig. 2. Any suitable operating means, such as is suggested at 45 in dotted lines in Fig. 1, may be attached to the rock-shaft and extend into reach of the driver for turning said rock-shaft in either direction so as to simultaneously move the clutch members 28 and 28$^a$ in opposite directions, thus throwing one of the clutches into driving connection after the other clutch has been thrown out, both operations being performed by rocking the shaft 44 in one direction. Of course, the rock-shaft may be placed in a neutral position, as indicated in Fig. 1, when both clutches will be thrown out. When the clutch member 28$^a$ is in driving connection with the supplemental clutch member 20$^a$, as illustrated in Fig. 3, the clutch member 28 will be out of driving connection with the clutch member 20, and the transmission driven shaft 18 will then be driven at second speed through the shafts 40 and 41, the meshing gears 19, on the motor shaft, 17, and 42 on the shaft 40, and the meshing gears 43, on the shaft 41, and 26 on the shaft 18. When the clutches are reversed so as to throw in the supplemental clutch members 20 and 28 and throw out the clutch members 20$^a$ and 28$^a$, the shaft 18 will be coupled directly to the motor shaft 17 for the direct drive, the gears 42 and 43 turning idly with their meshing gears 19 and 26, respectively.

Directly below the pair of shafts 17 and 18, a pair of third speed shafts are arranged and equipped in a similar manner as the second speed shafts just described. This third pair of shafts is indicated at 46 in Fig. 2, it being deemed unnecessary to show it in detail as it would amount to merely duplicating the showing of the second speed shafts in Fig. 3. The third speed shafts are provided with gears 47 and 48 meshing respectively with the gears 19 and 26, see Figs. 2 and 4.

A pair of reversing shafts is arranged below the second speed shafts and on the level with the third speed shafts. Said reversing shafts are indicated at 49 in Fig. 2 and are constructed and equipped with operating mechanism similar to that already described in connection with the second speed shafts. A gear 50, Fig. 2 is carried by the driving shaft of the reversing pair, and meshes with the gear 47 on the driving shaft of the third speed pair. The driven shaft of the reversing pair carries a gear 51, Fig. 4, which meshes with an intermediate gear 52 which, in turn, meshes with the gear 48 on the driven shaft of the third speed pair of shafts. The clutch operating worm gears 39$^b$ and 39$^c$, which are mounted on the third speed and reversing shafts, respectively, are oppositely threaded and mesh with oppositely threaded sections 53$^a$ and 53$^b$, respectively, of a rock-shaft 53 similar to the rock-shaft 44. By means of this rock-shaft 53 and its actuating mechanism suggested in dotted lines at 54, Fig. 1, the clutches of the third speed shafts and the reversing shafts may be alternately thrown in or out, or both placed in neutral position. When the third speed drive is to be used, the clutch therefor is thrown in and the clutch on the reversing shafts necessarily thrown out, the rock-shaft 44 having first been placed in neutral position so that the clutches on the direct drive shafts and the second speed shafts are also thrown out. The drive will then be from the motor shaft 17 to the driving shaft of the third speed pair by the intermeshing gears 19 and 47, and from the driving shaft of said third speed pair to the transmission shaft 18 through the intermeshing gears 48 and 26. For the reverse, the rock-shaft 44 is left in neutral position and the rock-shaft 53 turned to throw the clutch of the third speed shafts out of driving connection, and the clutch of the reversing shafts into driving connection. The drive will then be through the gears 19, 47 and 50 to the driving shaft of the reversing pair, and back from the driven shaft of said reversing pair, through the intermeshing gears 51, 52, 48 and 26 to the transmission shaft 18.

Having thus described my invention, what I claim as new and desire to secure by Letters Patent of the United States is:

1. A casing for transmission gearing, comprising a middle section having four walls, and end sections detachably connected to said middle section, the end walls of the middle section constituting partitions of the casing as a whole and providing journals for the gearing.

2. A casing for transmission gearing, comprising a middle section having four walls and open at the top and bottom, end sections having three walls and detachably connected to the ends of the middle section, and removable top and bottom plates to cover the openings in said middle and end sections.

3. A casing for transmission gearing, comprising a middle section having four walls and open at the top and bottom, end sections having three walls, said sections having flanges at their meeting edges and at their upper and lower edges, and top and bottom plates detachably connected to said upper and lower flanges of said sections, the meeting flanges of said sections being also detachably connected.

4. The combination with a driving and a driven shaft arranged end to end, of a clutch member fixed on one of the shafts, a supplemental clutch member splined on the other shaft and having oppositely facing shoulders, a threaded sleeve fitted loosely around said supplemental clutch member between said shoulders, means for holding said sleeve against turning but permitting it to move axially, a secondary pair of shafts also arranged end to end and geared respectively to the driving and driven shafts of the first pair, clutch members on said secondary pair of shafts similar to those of the first pair of shafts, a sleeve on the splined member of the second clutch constructed and arranged like the one on the first clutch, worm gears having internal threads engaging the respective sleeves, means for retaining said worm gears against axial movement, the worm teeth on said gears being oppositely inclined, and a rock shaft having oppositely inclined worm sections meshing with the respective worm gears, whereby a movement of said rock shaft in one direction will simultaneously move both clutches in opposite directions.

5. The combination with a driving and driven shaft, of a secondary pair of shafts, a sectional casing comprising a middle section and detachable end sections, said shafts being journaled in both the middle and end sections of the casing, intermeshing gears arranged on said shafts in the end sections of the casing, and selective clutch mechanism arranged in the center section of the casing.

6. The combination with a driving and a driven shaft arranged end to end, of another pair of shafts also arranged end to end, each of the shafts of the second pair being geared to a corresponding one of the first pair of shafts, a third pair of similar shafts one of which is geared directly to one of the shafts of the second pair, the other shaft of the third pair being connected to the other shaft of the second pair by a reversing train of gears, and selective clutch mechanism for driving through either the second or third pairs of shafts as well as direct through the first pair.

7. The combination with a driving and a driven shaft arranged end to end, of a second pair of similar shafts geared directly to the first pair, a third pair of similar shafts directly geared to the first pair, a fourth pair of similar shafts one of which is geared directly with a corresponding one of the third pair, the other shaft of the fourth pair being connected to the other one of the third pair of shafts by a reversing train of gears, and selective clutch mechanism for driving through any one of said pairs of shafts.

8. The combination with a driving and a driven shaft arranged end to end, of three other pairs of similar shafts, corresponding shafts of each pair being geared to one another, selective clutch mechanism for driving through any one of said pairs of shafts, and separate means for simultaneously moving the clutch mechanism of two of said pairs of shafts in opposite directions, there being separate means of a similar construction for moving the clutch mechanism of the other two pairs of shafts in the same manner.

In testimony whereof I have signed my name to this specification in the presence of two attesting witnesses.

GEORGE V. HARRIMAN.

Witnesses:
W. L. MOSELEY,
ARTHUR J. HAGAN.

Copies of this patent may be obtained for five cents each, by addressing the "Commissioner of Patents, Washington, D. C."